Sept. 13, 1966 H. DOUNDOULAKIS 3,273,156

RADIO TELESCOPE HAVING A SCANNING FEED SUPPORTED BY A CABLE SUSPENSION OVER A STATIONARY REFLECTOR

Filed Sept. 11, 1961 6 Sheets-Sheet 1

INVENTOR
HELIAS DOUNDOULAKIS
BY
Curtis, Morris & Safford
ATTORNEYS.

INVENTOR
HELIAS DOUNDOULAKIS
BY
Curtis, Morris & Safford
ATTORNEYS

INVENTOR
HELIAS DOUNDOULAKIS
BY
Curtis, Morris & Safford
ATTORNEYS.

INVENTOR
HELIAS DOUNDOULAKIS
BY
Curtis, Morris & Safford
ATTORNEYS

INVENTOR
HELIAS DOUNDOULAKIS
BY
Curtis, Morris & Safford
ATTORNEYS.

INVENTOR.
HELIAS DOUNDOULAKIS
BY
Constantine A. Michalos
ATTORNEY

United States Patent Office 3,273,156
Patented Sept. 13, 1966

3,273,156

RADIO TELESCOPE HAVING A SCANNING FEED SUPPORTED BY A CABLE SUSPENSION OVER A STATIONARY REFLECTOR

Helias Doundoulakis, Brooklyn, N.Y., assignor, by direct and mesne assignments, of twenty-five percent to Constantine A. Michalos, Fort Lee, N.J., and twenty-five percent to William J. Casey, Long Island, N.Y.

Filed Sept. 11, 1961, Ser. No. 137,202
8 Claims. (Cl. 343—765)

This invention relates to a radio antenna, and more particularly to an antenna of such size and design that it can, for example, be used for radar signaling to outer space or for radio telescopy.

An object of this invention is to provide in conjunction with a spheriform dish-type radio beam reflector of immense size a practical beam scanning arrangement so that the antenna can be adapted to send or receive signals from various directions.

Where radio signaling over vast distances, for example to the moon, or to objects in outer space, is required, it is advantageous to have a dish-type antenna of the largest practical diameter in order to minimize the beam width and increase the forward gain. At the present time, antennas of this kind with diameters of several hundred feet or so have been built, for example the radio telescope at Jodrell Bank in England, which is shaped like a giant saucer suspended in gimbals so that it can be pointed in any direction. But it appears that for all practical purposes this is the largest size which can be attained using conventional antenna mounting arrangements.

It is now proposed to build an antenna of this general kind but having a reflector dish of immense size and mounted in fixed relation to the ground. It is necessary to use in conjunction with this reflector a suspended movable antenna feed. But the tremendous size and weight of the feed structure presents serious difficulties, particularly since the antenna is exposed to seasonal weather and winds. The present invention provides a practical solution to these problems.

In accordance with the present invention, in one specific embodiment of it, there is provided in conjunction with a very large fixed reflector, a unique radio beam feeding and scanning arrangement. This includes a skeleton frame or truss suspended by cables over the center of the reflector. Beneath this frame is mounted a horizontal circular track which carries on wheels a supporting beam or arm. The latter in turn on its underside has an arcuately curved track on which travels a radio beam radiating element pointed toward the reflector. To "point" or orient the antenna in any direction within the solid angle limit of its scanning range, the radiating element is physically moved back and forth along the supporting arm which may simultaneously be revolved to any desired angular position.

In one particular installation where the reflector has a 1000 foot diameter, the total weight of the suspended beam feeding and scanning elements, which are preferably made of aluminum, are of the order of 250,000 pounds. To safeguard the antenna against possible damage or destruction in high winds, the suspended elements can be lowered by the cables supporting them into the mouth of the reflector where they will be partly shielded from winds and where the stress in the cables is greatly reduced.

A better understanding of the invention together with a fuller appreciation of its many advantages will best be gained from a study of the following description given in connection with the accompanying drawings wherein.

Figure 1:
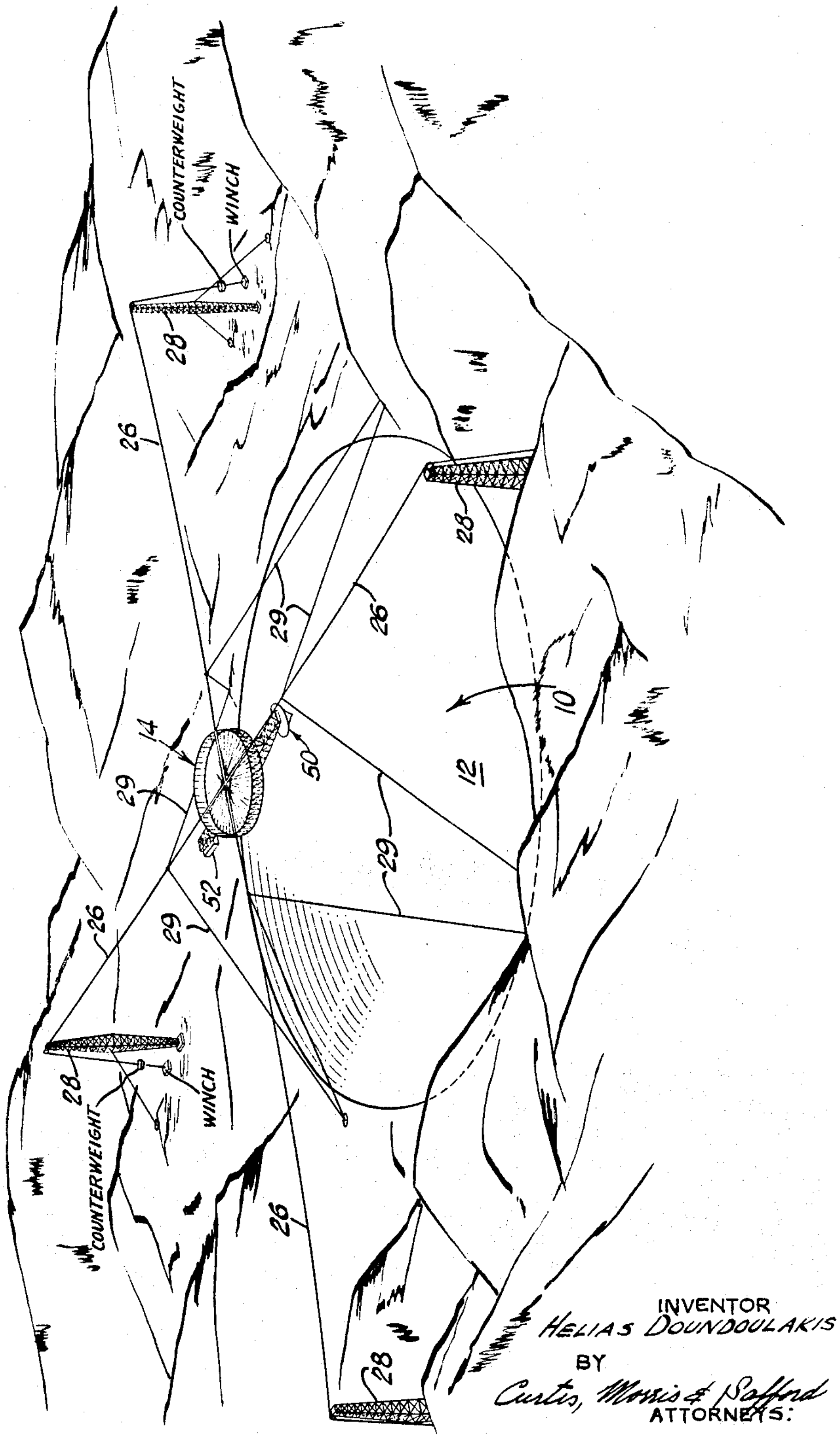
FIGURE 1 is a perspective view of an antenna installation embodying features of the invention.

The antenna 10 shown in FIGURE 1 comprises a stationary reflector 12, which has a concave spherical surface, and above which is suspended a movable beam feeding and scanning arrangement generally indicated at 14. Reflector 12, for example, has a diameter of 1000 feet and is preferably located in a suitable valley surrounded by hills. The radius of curvature of the reflector in this embodiment is 870 feet from a point vertically above the reflector. The rim of the reflector is 160 feet above its center. This reflector as seen also in FIGURES 2 and 7 is made of spherical metal segments 18 pieced together and supported closely above the ground on concrete footings 20 by metal braces 22.

Figures 2, 7:
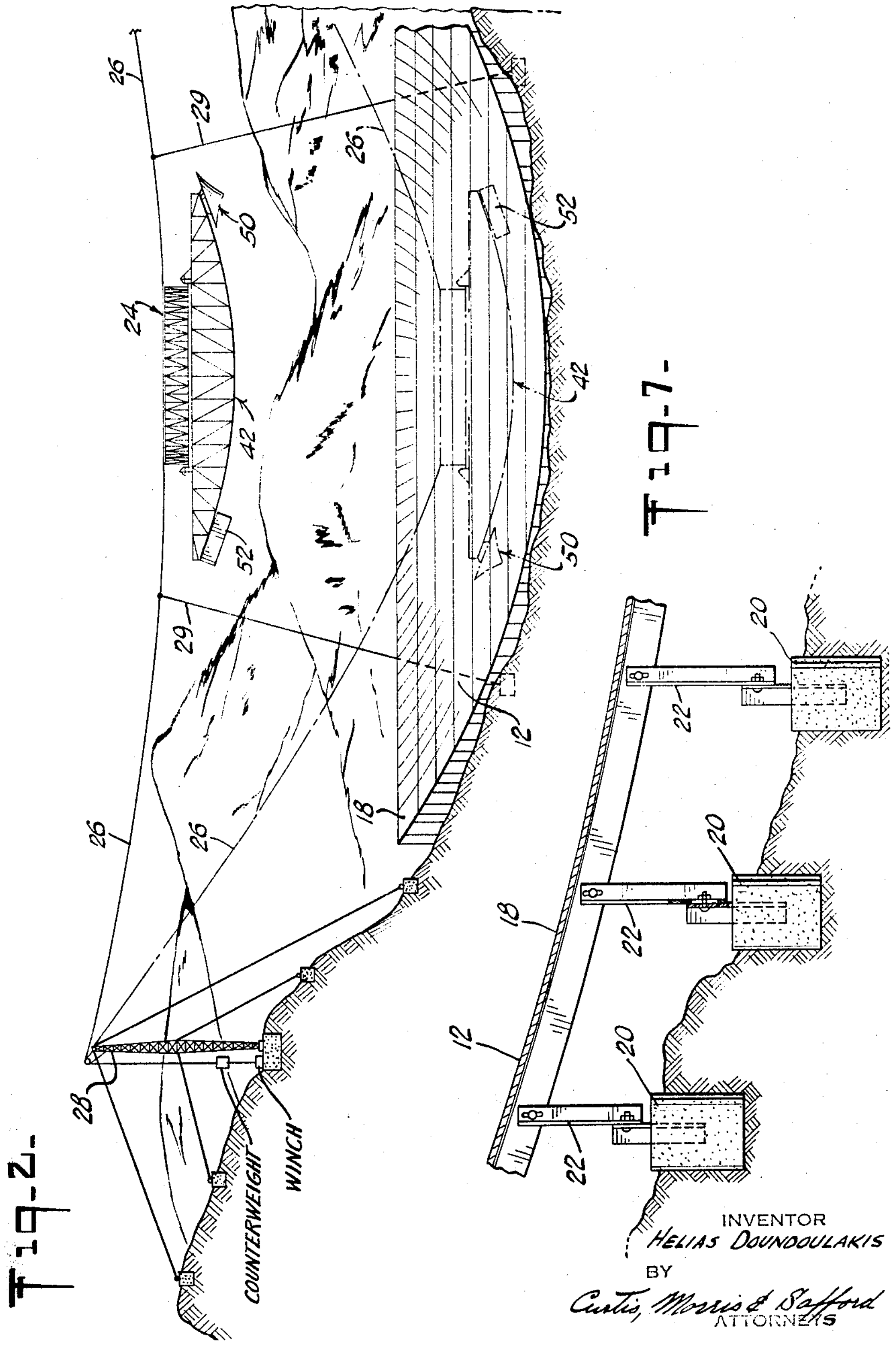
FIGURE 2 is an enlarged side section view of the antenna.
FIGURE 7 shows in enlarged detail some of the support footings for the reflector.
Figure 3:
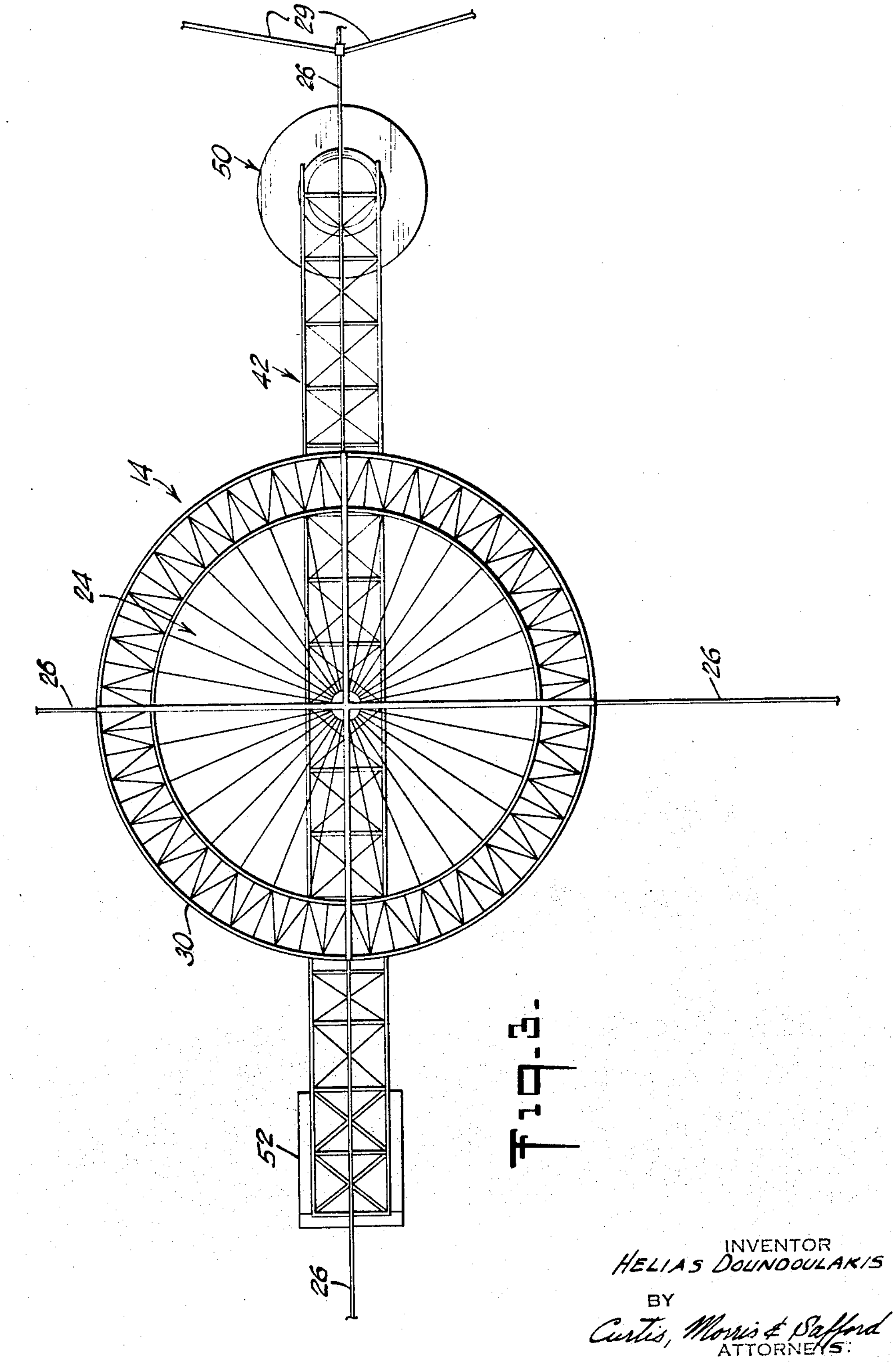
FIGURE 3 is a further enlarged top view of the suspended elements of the antenna.
Figure 4:
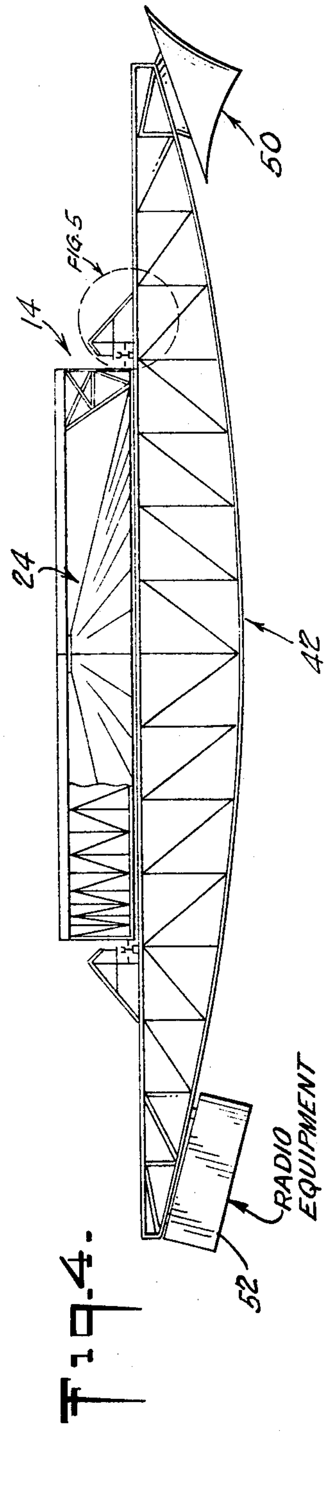
FIGURE 4 is a side view of the elements in FIGURE 3.

Antenna feed arrangement 14, as seen also in FIGURES 2, 3, and 4, comprises a skeleton truss 24 to which is connected the ends of four equally spaced supporting cables 26. These cables run respectively to four large towers 28 spaced beyond the rim of reflector 12. Each cable is counterweighted and can be reeled out from its tower in unison with the other cables to lower the suspended elements of the antenna into the mouth of the reflector, as indicated in FIGURE 2. In its raised position, the beam feed and scan structure is further steadied by guy wires 29.

Figure 5:
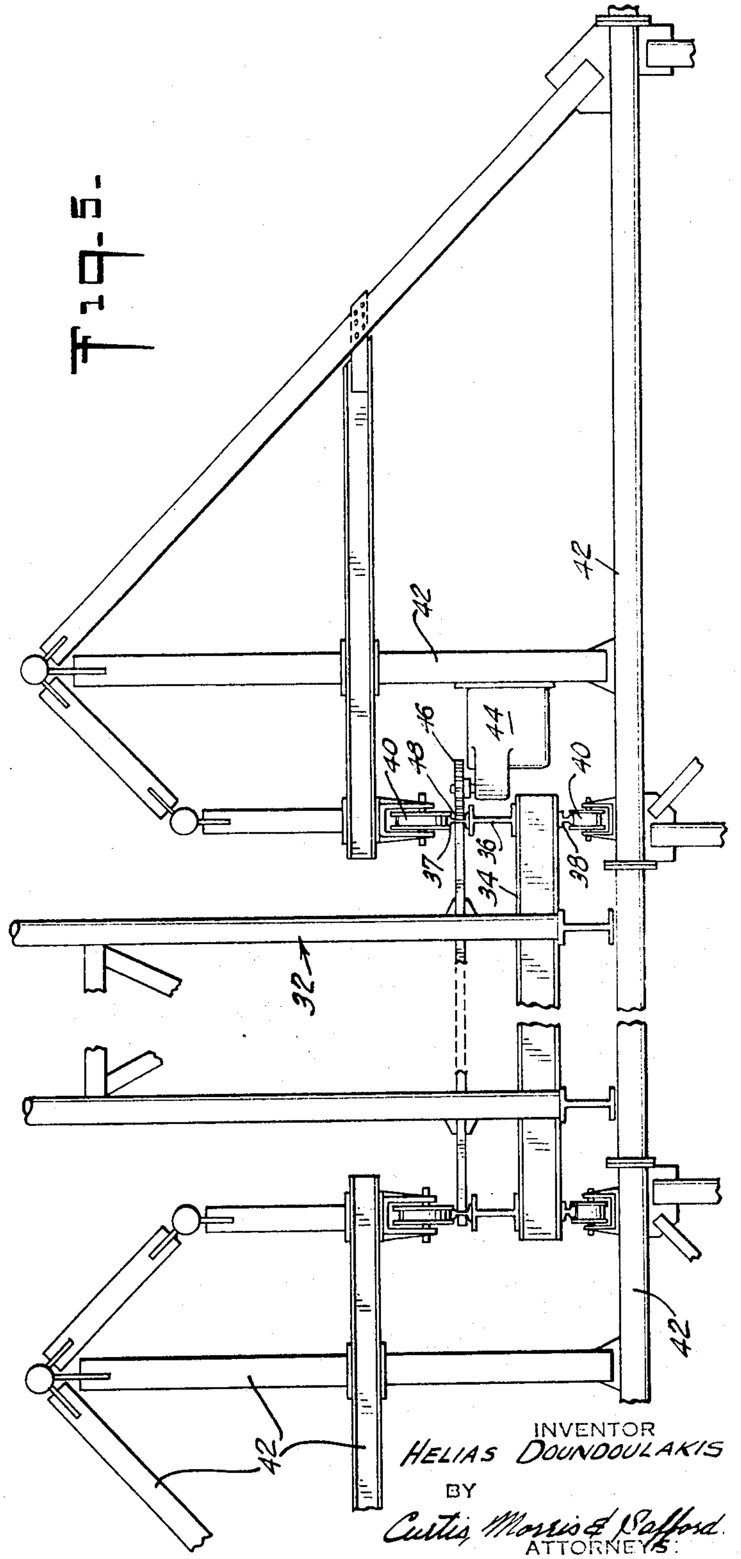
FIGURE 5 is a greatly enlarged detail of FIGURE 4 showing the mounting of the supporting arm on the circular track.
Figure 6:
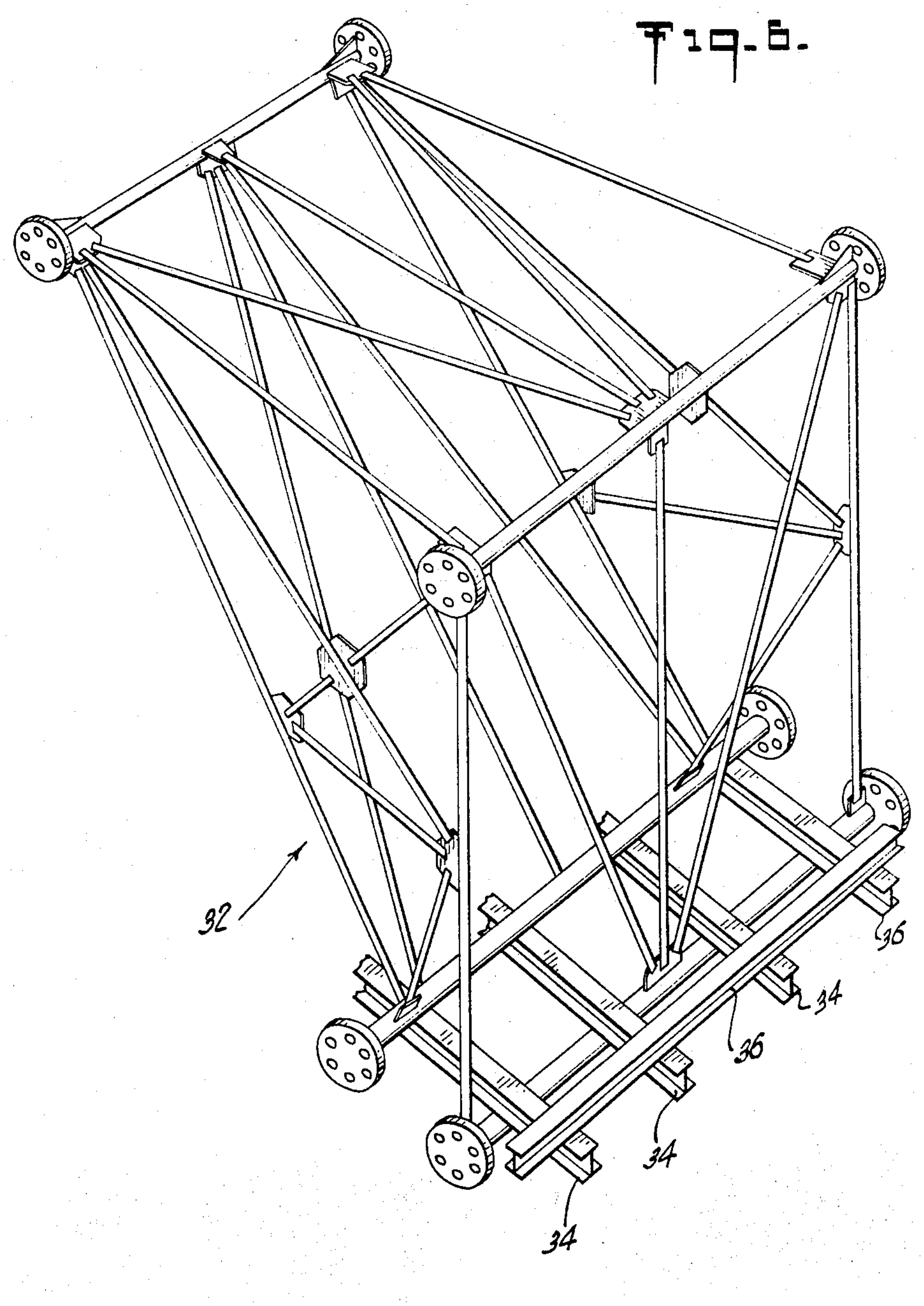
FIGURE 6 shows in enlarged detail of a portion of the track.

Beneath skeleton truss 24 is mounted a circular track 30 having an outer diameter of 176 feet. This element is made of a number of segments (e.g. 32 segments) joined end-to-end in a closed ring, one of these segments 32 being shown in FIGURE 6. These segments along their outer lower rim carry projecting beams 34 which in turn support a curved I-beam 36. The latter as seen in FIGURE 5 supports a rail or track 37, a similar rail 38 being mounted underneath beams 34. Mounted in captive relation on rails 37 and 38 by means of wheels 40 is a horizontal arm or supporting beam member 42 (see also FIGURES 1–4) which can be revolved along rails 37 and 38 continuously an unlimited amount in either direction. This arm as seen in FIGURE 5, is self-propelled by means of an electric motor 44 driving a spur gear 46 which meshes with a toothed rail 48 carried by rail 37.

As seen in FIGURE 4, arm 42 has an arcuately curved under surface on which a radio beam radiating element 50 is mounted by means of a captive wheel and rail arrangement (not shown in detail). This is movable back and forth along arm 42, and in any position remains the same radial distance from reflector 14, for example 364 feet, in the particular embodiment disclosed. The radius of curvature of the underside of arm 42 along which antenna element 50 moves is 506 feet, the total length of the arm being 350 feet. Antenna element 50 is a conical type radiator about 23 feet deep and 60 feet in diameter. In any position it radiates a full circle of illumination onto reflector 14. It will be evident to those skilled in the art that other types of radiating elements can be used with this general arrangement. Since conical radiators are well known in the art, element 50 will not be described in further detail.

In order to permit radiating element 50 to be positioned within an accuracy of a few inches, there is, as seen in FIGURE 4, mounted on the opposite end of arm 42 a counterweight 52. This moves along arm 42 in unison with but oppositely to element 50 so that the center of gravity of the total structure remains at the center of arm 42. Counterweight 52 can consist of the radio transmitter and receiver used with element 50. This eliminates the problem of getting radio frequency power to the moving radiator from the ground.

Figure 8:
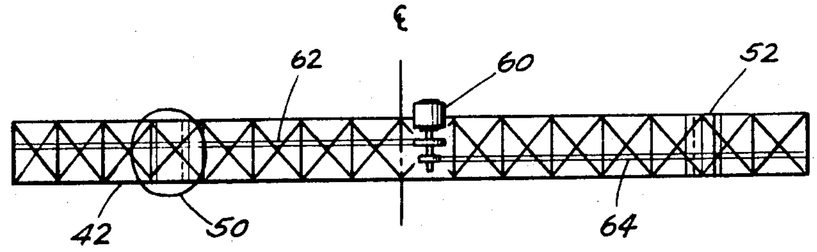
FIGURE 8 shows a further detailed top view of FIGURE 4.
Figure 9:
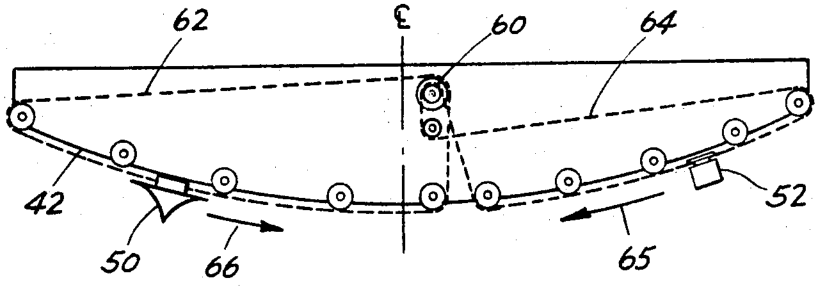
FIGURE 9 shows a side view of FIGURE 8.
Figure 10:
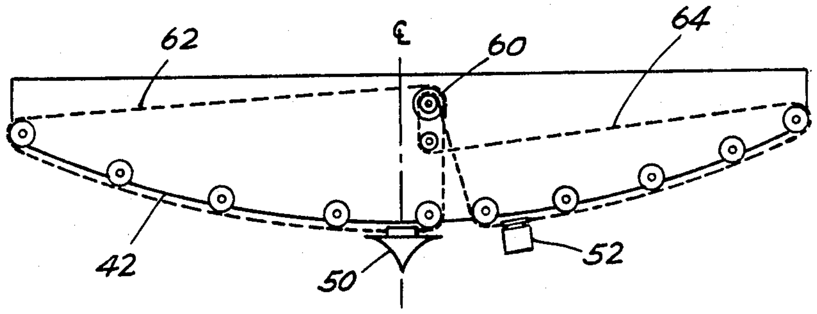
FIGURE 10 shows another position of the elements of FIGURE 9.

FIGURE 8, 9 and 10 provide for one conventional means of moving the radiating or antenna element 50 in unison with the counterweight 52. It provides a simple means of a "curtain-type" arrangement to move the antenna 50 in relation to the counterweight 52. Specifically, it provides for a motor 60 driving a pair of closed-looped conveyor chains 62 and 64 which are attached to the antenna 50 and the counterweight 52 respectfully to drive the same in unison. That is, as the chain 64 moves the counterweight 52 towards the center of the beam member 42 from the position shown in FIGURE 9 to the position shown in FIGURE 10 as shown by arrow 65, the antenna element 50 is moved from the position shown in FIGURE 9 to the position shown in FIGURE 10 as shown by arrow 66. This curtain-type arrangement permits the counterweight 52 to aid the motor 60 in counterbalancing antenna element 50.

It will now be appreciated that the invention makes practical the construction of gigantic dish-type antennas. For the embodiment described above, the antenna gain is approximately 1,000,000 and the beam angle, 0.14° which can be scanned over a 40° angle. The brace and strut type of construction of the suspended elements of the antenna gives a structure relatively light in weight yet very strong and not unduly affected by normal winds. It is thus possible to orient the beam radiating element of the antenna quickly and to an accuracy of within a few inches. Accordingly, in spite of its tremendous size, this antenna is a precision instrument.

The above description is intended in illustration and not in limitation of the invention. Various changes or modifications may occur to those skilled in the art and these can be made without departing from the spirit or scope of the invention as set forth.

I claim:

1. An antenna comprising, in combination, a concave reflector affixed to the surface of the earth, and a radio beam feeding and scanning mechanism including a network of cables, a skeleton frame, said frame being supported by said network at an accurately determinable position above said reflector, a circular track mounted and aligned generally horizontally upon said frame, an arm mounted upon and being revolvable on said circular track, and a beam radiating element mounted upon said arm, said beam radiating element being movable along said arm, the rotation of said arm on said circular track and the movement of said radiating element along said arm providing feeding and scanning motion for said radiating element.

2. An antenna comprising, in combination, a concave reflector affixed to the surface of the earth, and a radio beam feeding and scanning mechanism including a cable network, a skeleton frame, said frame being supported by said cable network at an accurately determinable position above said reflector, a circular track mounted and aligned generally horizontally upon said frame, said circular track comprising a pair of rails shaped to form circles, said rails being mounted horizontally in said frame and being vertically spaced from one another, a feed-carrying arm, a plurality of flanged wheels mounted on said arm and arranged to engage and roll upon the upper surface of one of said rails and the lower surface of the other of said rails, said arm being rotatable on said track and being held in captive relation to said rails by means of said flanged wheels, an arcuate track affixed to said arm, and a beam radiating element mounted on said arcuate track, said beam radiating element being movable along said arm on said arcuate track, the rotation of said arm on said circular track and the movement of said radiating element along said arcuate track providing feeding and scanning motion for said radiating element.

3. In an antenna usuable in radar signaling and radio teloscopy and including a concave reflector affixed to the surface of the earth and a feed element, apparatus for supporting and moving said feed element above the surface of said reflector, said apparatus comprising, in combination, a plurality of cables extending generally horizontally and stretched taut above the surface of said reflector to form a cable network, a truss support structure attached to said cable network, a circular track affixed to said support structure, said circular track including a rail having a generally I-shaped cross-section and being curved to form a circle, an arm mounted on and being revolvable upon said circular track, an arcuate track affixed to said arm, and a beam radiating element mounted on said arcuate track, said beam radiating element being movable along said arm on said arcuate track.

4. Apparatus as in claim 3 including a cogged member affixed to said rail along its length, a drive motor affixed to said arm and having a spur gear attached to its output shaft, said spur gear engaging said cogged member to provide a driving connection between said motor and said rail.

5. An antenna comprising, in combination, a concave reflector affixed to the surface of the earth, and a radio beam feeding and scanning mechanism including a cable network, a skeleton frame, said frame being supported by said cable network at an accurately determinable position above said reflector, a circular track mounted and aligned generally horizontally upon said frame, an arm mounted on and being revolvable upon said circular track, a beam radiating element mounted upon said arm, and a counterweight mounted on said arm in a position such that the turning moment of force produced on said arm by said radiating element is effectively balanced and there is substantially no net moment of force tending to turn said arm to a non-horizontal position, said beam radiating element being movable along said arm, the rotation of said arm on said circular track and the movement of said radiating element along said arm providing feeding and scanning motion for said radiating element.

6. Apparatus as in claim 5 wherein said counterweight is composed of at least a portion of the transmitting and receiving equipment for said antenna.

7. An antenna comprising, in combination, a concave reflector affixed to the surface of the earth, and a radio beam feeding and scanning mechanism including a cable network, a skeleton frame, said frame being supported by said cable network at an accurately determinable position above said reflector, a circular track mounted and aligned generally horizontally upon said frame, an arm mounted on and being revolvable upon said circular track, an arcuate track affixed to said arm, and a beam radiating element mounted on said arcuate track, said beam radiating element being movable along one half of the length of said arcuate track, a counterweight mounted on said arcuate track and being movable along the other half of the length of said arcuate track, means for moving said radiating element and said counterweight along said arcuate track simultaneously and maintaining said arm in substantial equilibrium, the rotation of said arm on said circular track and the movement of said radiating element along said arcuate track providing feeding and scanning motion for said radiating element.

8. In an antenna utilizable in radar signalling and radio teloscopy and including a concave reflector affixed to the surface of the earth, a feed element, a support structure to which said feed element is attached and a plurality of cables attached to said support structure, means for applying tension to said cables to draw them taut and for supporting said cables above the surface of said reflector, said means comprising a tower at each end of each of said cables, a counterweight attached to each end of each of said cables to apply tension to said cables, and winding means for winding and unwinding each of said cables to apply tension to or release tension from said cables so as to provide for lowering said cables into the enclosure formed by said reflector to protect the apparatus attached to said cables from damage due to direct exposure to strong winds.

References Cited by the Examiner

UNITED STATES PATENTS

| | | | |
|---|---|---|---|
| 2,076,222 | 4/1937 | Bruce | 343—733 X |
| 2,976,533 | 3/1961 | Salisbury | 343—761 X |
| 3,153,798 | 10/1964 | Ashton | 343—765 |

FOREIGN PATENTS

| | | |
|---|---|---|
| 177,912 | 4/1922 | Great Britain. |

OTHER REFERENCES

Cornell University Ionospheric Radar Probe, May 1961.

IRE Transactions on Antennas and Propagation, vol. AP–9, No. 1, January 1961, pages 7–22.

HERMAN KARL SAALBACH, *Primary Examiner.*

E. LIEBERMAN, *Assistant Examiner.*